(12) United States Patent
Moshavi et al.

(10) Patent No.: US 8,737,247 B1
(45) Date of Patent: *May 27, 2014

(54) DATA CHANNEL NOISE ESTIMATION USING PILOT CHANNEL

(75) Inventors: Shimon Moshavi, Bet Shemesh (IL); Gil Katzir, Herzliya (IL); Nimrod Mesika, Tel Aviv (IL); Maor Margalit, Modiin (IL)

(73) Assignee: Marvell International Ltd., Hamilton (BM)

( * ) Notice: Subject to any disclaimer, the term of this patent is extended or adjusted under 35 U.S.C. 154(b) by 203 days.

This patent is subject to a terminal disclaimer.

(21) Appl. No.: 13/246,875

(22) Filed: Sep. 28, 2011

Related U.S. Application Data

(60) Provisional application No. 61/391,343, filed on Oct. 8, 2010.

(51) Int. Cl.
H04B 1/7115 (2011.01)

(52) U.S. Cl.
USPC .......... 370/252; 370/328; 370/329; 370/335; 375/346; 375/320; 714/746; 714/786

(58) Field of Classification Search
None
See application file for complete search history.

(56) References Cited

U.S. PATENT DOCUMENTS

| | | | |
|---|---|---|---|
| 7,106,792 B2 | 9/2006 | Corbaton et al. | |
| 7,664,061 B2 * | 2/2010 | Hottinen | 370/310 |
| 8,301,989 B1 * | 10/2012 | Griniasty | 714/786 |
| 8,315,339 B2 * | 11/2012 | Rosenqvist et al. | 375/326 |
| 8,331,505 B2 * | 12/2012 | Abrishamkar et al. | 375/346 |
| 8,411,802 B2 * | 4/2013 | Kim et al. | 375/340 |
| 2001/0036150 A1 | 11/2001 | Padovani | |
| 2003/0072390 A1 * | 4/2003 | Corbaton et al. | 375/316 |
| 2003/0092447 A1 * | 5/2003 | Bottomley et al. | 455/453 |
| 2004/0076224 A1 * | 4/2004 | Onggosanusi et al. | 375/144 |
| 2005/0002444 A1 | 1/2005 | Wei et al. | |
| 2005/0089115 A1 * | 4/2005 | Hartmann et al. | 375/285 |
| 2007/0054692 A1 * | 3/2007 | Nie et al. | 455/522 |
| 2007/0287382 A1 | 12/2007 | Catreux-Erceg et al. | |
| 2008/0232327 A1 * | 9/2008 | Kuroyanagi et al. | 370/335 |
| 2009/0016420 A1 * | 1/2009 | Kwak et al. | 375/227 |
| 2009/0141786 A1 | 6/2009 | Park et al. | |
| 2009/0296563 A1 * | 12/2009 | Kishiyama et al. | 370/210 |
| 2009/0310708 A1 * | 12/2009 | Cheng et al. | 375/298 |
| 2009/0310715 A1 * | 12/2009 | Cairns et al. | 375/320 |
| 2010/0284443 A1 | 11/2010 | Rosenqvist et al. | |
| 2011/0305195 A1 * | 12/2011 | Forck et al. | 370/328 |
| 2012/0082192 A1 * | 4/2012 | Pelletier et al. | 375/219 |

OTHER PUBLICATIONS

3GPP TS 25.308 V8.9.0, "3rd Generation Partnership Project; Technical Specification Group Radio Access Network; High Speed Downlink Packet Access (HSDPA); Overall description; Stage 2 (Release 8)", Sep. 2010.
U.S. Appl. No. 13/231,971, filed Sep. 14, 2011.
U.S. Appl. No. 13/231,971 Office Action dated Jun. 7, 2013.
U.S. Appl. No. 13/231,971 Office Action dated Oct. 24, 2013.

* cited by examiner

Primary Examiner — Kamal Divecha
Assistant Examiner — Amy Ling

(57) ABSTRACT

A method includes receiving a Code Division Multiple Access (CDMA) carrier carrying at least a pilot channel. Differences are computed between selected soft pilot symbols received on the pilot channel. Based on the computed differences between the selected soft pilot symbols received on the pilot channel, a level of noise is estimated for a data channel that is to be transmitted on the CDMA carrier.

20 Claims, 3 Drawing Sheets

DATA CHANNEL NOISE ESTIMATION USING PILOT CHANNEL

CROSS-REFERENCE TO RELATED APPLICATIONS

This application claims the benefit of U.S. Provisional Patent Application 61/391,343, filed Oct. 8, 2010, whose disclosure is incorporated herein by reference.

FIELD OF THE DISCLOSURE

The present invention relates generally to communication systems, and particularly to methods and systems for noise estimation.

BACKGROUND

The Third-Generation Partnership Project (3GPP) Wideband Code-Division Multiple Access (WCDMA) specifications define a high-speed downlink data mode called High-Speed Downlink Packet Access (HSDPA). This mode is specified, for example, in "3rd Generation Partnership Project; Technical Specification Group Radio Access Network; High Speed Downlink Packet Access (HSDPA); Overall description; Stage 2 (Release 8)," TS 25.308, version 8.9.0, September, 2010, which is incorporated herein by reference. In the HSDPA mode, downlink data is transmitted on High-Speed Downlink Shared channels (HS-DSCH).

The description above is presented as a general overview of related art in this field and should not be construed as an admission that any of the information it contains constitutes prior art against the present patent application.

SUMMARY

An embodiment that is described herein provides a method including receiving a Code Division Multiple Access (CDMA) carrier carrying at least a pilot channel. Differences are computed between selected soft pilot symbols received on the pilot channel. Based on the computed differences between the selected soft pilot symbols received on the pilot channel, a level of noise is estimated for a data channel that is to be transmitted on the CDMA carrier.

In some embodiments, the soft pilot symbols are represented by respective complex numerical values, and computing the differences includes subtracting the complex numerical values of the selected soft pilot symbols from one another. In an embodiment, computing the differences includes specifying a maximal time duration between symbols on which the differences are to be computed, selecting soft pilot symbols that are separated from one another by no more than the maximal time duration, and computing the differences between the selected soft pilot symbols. In a disclosed embodiment, the selecting soft pilot symbols includes choosing pairs of the soft pilot symbols that are separated by no more than the maximal time duration, and computing a respective difference between the soft pilot symbols in each pair. In another embodiment, the choosing pairs includes selecting pairs of adjacent soft pilot symbols. In yet another embodiment, computing the differences includes calculating an average value of the soft pilot symbols over the maximum time duration, and calculating the respective differences between the soft pilot symbols and the average value. In still another embodiment, specifying the maximal time duration includes adaptively setting the maximal time duration as a function of a velocity of motion of a receiver that receives the CDMA carrier.

In some embodiments, receiving the CDMA carrier includes receiving a sequence of the soft pilot symbols in which each soft pilot symbol has a respective polarity, and computing the differences includes identifying pairs of the soft pilot symbols such that the soft pilot symbols in each pair have the same polarity, and computing a respective difference between the soft pilot symbols in each pair. In an embodiment, receiving the CDMA carrier includes receiving both the data channel and the pilot channel that are each transmitted via primary and diversity transmit antennas in accordance with a Space-Time Transmit Diversity (STTD) mode. In an embodiment, computing the differences includes estimating first differences between pairs of the received soft pilot symbols corresponding to pilot symbols transmitted via the primary transmit antenna, and estimating second differences between pairs of the received soft pilot symbols corresponding to pilot symbols transmitted via the diversity transmit antenna.

In another embodiment, computing the differences includes processing the received soft pilot symbols corresponding to pilot symbols transmitted via the primary and diversity transmit antennas to produce a pair of virtual pilot signals having respective signal components that vary over time at less than a predefined rate. In yet another embodiment, receiving the CDMA carrier includes receiving the data channel that is transmitted via primary and diversity transmit antennas in accordance with a Closed-Loop Transmit Diversity (CLTD) mode, and receiving the pilot channel that is transmitted via the primary and diversity transmit antennas in accordance with a Space-Time Transmit Diversity (STTD) mode. In an embodiment, computing the differences includes applying CLTD weights to first differences between pairs of the received soft pilot symbols corresponding to pilot symbols transmitted via the primary transmit antenna, and to second differences between pairs of the received soft pilot symbols corresponding to pilot symbols transmitted via the diversity transmit antenna. In an embodiment, computing the differences includes applying CLTD weights to the received soft pilot symbols corresponding to pilot symbols transmitted via the primary and diversity transmit antennas to produce a pair of virtual pilot signals having respective signal components that vary over time at less than a predefined rate.

In some embodiments, receiving the CDMA carrier includes receiving a Wideband CDMA (WCDMA) carrier. In an embodiment, estimating the level of noise includes scaling the estimated level of noise by a ratio between a first spread factor used on the data channel and a second spread factor used on the pilot channel. In a disclosed embodiment, receiving the CDMA carrier includes receiving the data channel that is transmitted via primary and diversity transmit antennas in accordance with a Multiple-Input Multiple-Output (MIMO) mode in which multiple data streams are transmitted concurrently via the primary and diversity transmit antennas.

There is additionally provided, in accordance with an embodiment of the present invention, apparatus including a receiver front end and processing circuitry. The receiver front end is configured to receive a Code Division Multiple Access (CDMA) carrier carrying at least a data channel and a pilot channel. The processing circuitry is configured to compute differences between selected soft pilot symbols received on the pilot channel, and to estimate, based on the computed differences, a level of noise for a data channel that is to be transmitted on the CDMA carrier. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
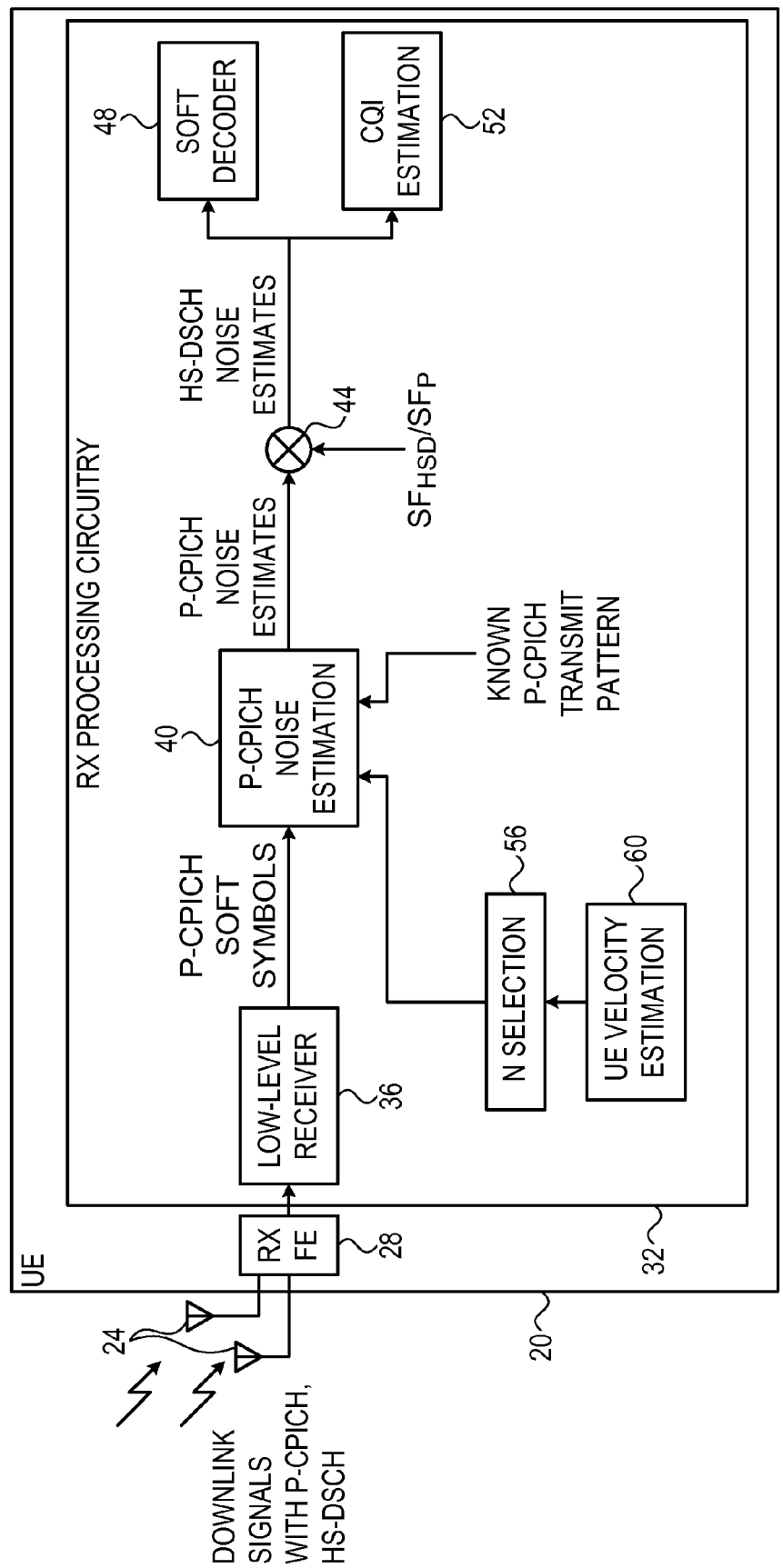
FIG. 1 is a block diagram that schematically illustrates a mobile communication terminal, in accordance with an embodiment that is described herein.

Embodiments that are described herein provide improved methods and systems for noise estimation in Code-Division Multiple Access (CDMA) receivers. The disclosed techniques compute accurate noise level estimates for a data channel used for transmitting data, based on measurements that are performed on a pilot channel that is normally used for synchronization and channel measurements. Although the embodiments described herein refer mainly to reception and processing of Wideband CDMA (WCDMA) carriers, e.g., Long Term Evolution (LTE) or LTE-Advanced (LTE-A) carriers, the disclosed techniques can be used with various other types of CDMA carriers. In the present context, the term "CDMA" includes WCDMA as well as any other form of CDMA.

In some embodiments, a receiver receives a CDMA carrier that carries at least a pilot channel, for example a pilot channel and one or more data channels. In the embodiments described herein, the receiver operates in the HSDPA mode, the data channel comprises a High-Speed Downlink Shared channel (HS-DSCH) that carries downlink data, and the pilot channel comprises a Primary Common Pilot Channel (P-CPICH) that is normally used by the UE for synchronizing with the base station and for performing channel measurements. The disclosed techniques, however, are applicable to other configurations and modes and to other types of channels, as well.

In the disclosed embodiments, the receiver decodes the pilot channel to produce soft pilot symbols, computes differences between selected soft pilot symbols, and estimates the data channel noise level based on these differences. In an embodiment, the soft pilot symbols comprise complex numerical values, and the receiver computes the differences by subtracting one soft pilot symbol from another. In an embodiment, the receiver selects pairs of soft pilot symbols and subtracts the soft pilot symbols in each pair from one another. The resulting differences are averaged to produce pilot channel noise estimates. The pilot channel noise estimates are scaled by the ratio between spread factors on the data channel and pilot channel, to produce data channel noise estimates. The receiver uses the estimated data channel noise, for example, for computing soft metrics to be used by the receiver in decoding the HS-DSCH data and/or for estimating the HS-DSCH channel quality.

It is noted that in some scenarios the received CDMA carrier carries a pilot channel but not a data channel, at least not a data channel addressed to the UE in question. In other scenarios the received CDMA carrier carries both a pilot channel and one or more data channels. In some embodiments, the UE applies the disclosed techniques to estimate the noise level for the data channel regardless of whether the data channel is received on the CDMA carrier. This noise estimate is used by the base station, for example in scheduling subsequent data transmissions.

In various embodiments, the receiver selects the pairs of soft pilot symbols in accordance with different criteria. Typically, the receiver selects the pairs such that the pilot signals (as opposed to noise components) in each pair are substantially constant or at least vary by less than a certain tolerable variation. By selecting the pairs in this manner, the differences between soft pilot symbols reflect noise on the pilot channel with high accuracy.

Several selection criteria are described herein. In some embodiments, the receiver selects pairs of adjacent soft pilot symbols. In other embodiments, the receiver defines a maximal time duration, and selects the pairs of soft pilot symbols such that the soft pilot symbols in each pair are separated from one another by no more than this time duration. When the receiver is part of a mobile communication terminal, for example, the maximal time duration in an embodiment depends on the velocity of the terminal.

Estimating the data channel noise based on the pilot channel is highly effective, because the pilot symbols are continuously available and their signal components are known in advance. Pilot-based estimation also lends itself to simple, firmware- or hardware-based implementation in an embodiment. On the other hand, pilot-based noise estimation may be sensitive to pilot signal leakage. For example, when using a high spread factor (e.g., 256) on the pilot channel, the pilot channel noise is often in the order of 20-40 dB lower than the pilot signal. In such conditions, even small pilot signal leakage may distort the noise estimation significantly. Since the disclosed techniques estimate the pilot channel noise based on differences between soft pilot symbols having nearly identical signal components, the signal components substantially cancel-out when the differences are computed, and therefore pilot signal leakage into the noise estimation is largely nulled out.

In some embodiments, the data channel and the pilot channel are transmitted using transmit diversity modes such as Space-Time Transmit Diversity (STTD) or Closed-Loop Transmit Diversity (CLTD). In these embodiments, the pilot symbols may be transmitted via different base station transmit antennas at different polarities at different times, in accordance with a predefined pattern. Some disclosed techniques ensure that each selected pair of soft pilot symbols comprises symbols of the same polarity.

In some embodiments, the pilot channel is transmitted using one transmit diversity mode while the data channel is transmitted using a different transmit diversity mode. In other embodiments, the base station transmits in a Multiple-Input Multiple-Output (MIMO) mode in which multiple data streams are transmitted in parallel. Several example techniques that estimate the data channel noise based on the soft pilot symbols in these modes are described further below.

FIG. 1 is a block diagram that schematically illustrates a mobile communication terminal 20, in accordance with an embodiment that is described herein. In the present example, terminal 20 comprises a WCDMA User Equipment (UE) that supports the HSDPA mode of operation. In alternative embodiments, terminal 20 may comprise any other suitable kind of mobile terminal.

The receiver section of terminal 20 comprises one or more receive antennas 24 for receiving downlink signals from a base station (not shown in the figure). The downlink signal comprises a WCDMA carrier that carries multiple WCDMA channels—typically a pilot P-CPICH and one or more HS-DSCH data channels. The P-CPICH comprises pilot symbols that are known in advance to the receiver and are used, for example, for synchronization of the UE to the base station and for performing channel measurements by the UE. The HS-DSCH carries user data.

Although the embodiments described herein refer mainly to P-CPICH and HS-DSCH, the disclosed techniques can be used with any other suitable type of pilot channel and data channel, respectively. In the context of the present patent application and in the claims, the term "pilot channel" refers to a channel on which a base station transmits symbols or other waveforms that are known in advance to the UEs, e.g., for enabling the UEs to synchronize to the base station and/or perform parameter measurements. The term "data channel" refers to a channel that carries user data, and possibly other data, between the base station and a UE. A pilot channel, by contrast, does not carry user data.

A Receiver Front End (RX FE) 28 down-converts the received signals from Radio Frequency (RF) to baseband and typically applies other functions such as filtering, amplification, gain control and digitization. The digitized baseband signals are provided to RX processing circuitry 32. FIG. 1 shows only the elements of circuitry 32 that are relevant to the disclosed noise estimation techniques, for the sake of clarity. The operations performed by the various elements of circuitry 32 are addressed in greater detail further below.

In some embodiments, processing circuitry 32 comprises a low-level receiver 36 that decodes the P-CPICH to produce soft pilot symbols. The low-level receiver typically produces the soft pilot symbols by de-spreading the received pilot symbols (which are transmitted by the base station with a high spread factor). Each soft pilot symbol comprises a complex number, which indicates the magnitude and phase at which a respective pilot symbol was received by a given antenna 24 of the UE.

A P-CPICH noise estimation module 40 estimates the noise level of the pilot channel (P-CPICH in this example) by processing the soft pilot symbols, using techniques that are described in detail below. Typically, module 40 computes differences between selected soft pilot symbols to produce pilot noise estimates. In some embodiments, module 40 selects the pairs such that the pilot symbols in each pair are separated in time by no more than a certain maximal time duration. In the present example, the maximal time duration is defined in terms of a number of pilot symbols denoted N, i.e., the pilot symbols in each pair are separated by no more than N pilot symbols.

In these embodiments, circuitry 32 comprises a selection module 56 that selects the value of N and provides the selected value to module 40. Typically, module 56 sets (and possibly adapts) the value of N such that the variation in the signal components of the two soft pilot symbols in each pair is smaller than a predefined tolerable variation. In an example embodiment, module 56 sets the value of N depending on the velocity of motion of UE 20 relative to the base station.

In the embodiment seen in FIG. 1, circuitry 32 comprises a UE velocity estimation module 60 that estimates the UE velocity and provides the estimated velocity to module 56. When the UE velocity is low, module 56 increases N so as to improve the noise estimation accuracy. When the UE velocity is high, module 56 decreases N in order to avoid large variations in pilot signal component in the selected pairs of soft pilot symbols. In one example embodiment, N=4, and module 40 selects up to six pairs of soft pilot symbols: $\{1^{st}, 2^{nd}\}$, $\{1^{st}, 3^{rd}\}$, $\{1^{st}, 4^{th}\}$, $\{2^{nd}, 3^{rd}\}$, $\{2^{nd}, 4^{th}\}$ and $\{3^{rd}, 4^{th}\}$. In another example embodiment N is fixed at N=2, in which case module 40 selects pairs of adjacent soft pilot symbols. In this embodiment, modules 56 and 60 may be omitted.

In some embodiments, module 40 accepts as input the pattern in which the pilot symbols are transmitted by the base station. In particular, the pattern defines the polarity of each pilot symbol. Module 40 may use this pattern in selecting pairs of pilot symbols—this technique is explained in detail below. A scaler 44 scales the pilot noise estimates by the ratio of spread factors used on the HS-DSCH and P-CPICH, to produce noise estimates for the data channel (HS-DSCH in this example).

Circuitry 32 may use the data channel noise estimates for various purposes. In some embodiments, a soft decoder 48 decodes soft HS-DSCH symbols in order to recover the data transmitted in the HS-DSCH. In an embodiment, soft decoder 48 computes soft decoding metrics based on the data channel noise estimates output by scaler 44, and decodes the HS-DSCH symbols using the soft decoding metrics.

In some embodiments, a Channel Quality Indicator (CQI) estimation module 52 estimates the channel quality on the HS-DSCH based on the data channel noise estimates output by scaler 44. The CQI is typically reported to the base station over an uplink channel (not shown in the figure). Further alternatively, circuitry 32 may use the data channel noise estimates for any other suitable purpose.

The UE and processing circuitry configurations shown in FIG. 1 are example configurations, which are depicted solely for the sake of clarity. In alternative embodiments, any other suitable UE and processing circuitry configurations can be used. UE and processing circuitry elements that are not mandatory for understanding of the disclosed techniques have been omitted from the figure for the sake of clarity.

In some embodiments, some or all of the elements of UE 20 are implemented in hardware, such as using one or more Radio Frequency Integrated Circuits (RFICs), Field-Programmable Gate Arrays (FPGAs) or Application-Specific Integrated Circuits (ASICs). In an alternative embodiment, certain UE elements, such as certain elements of processing circuitry 32, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
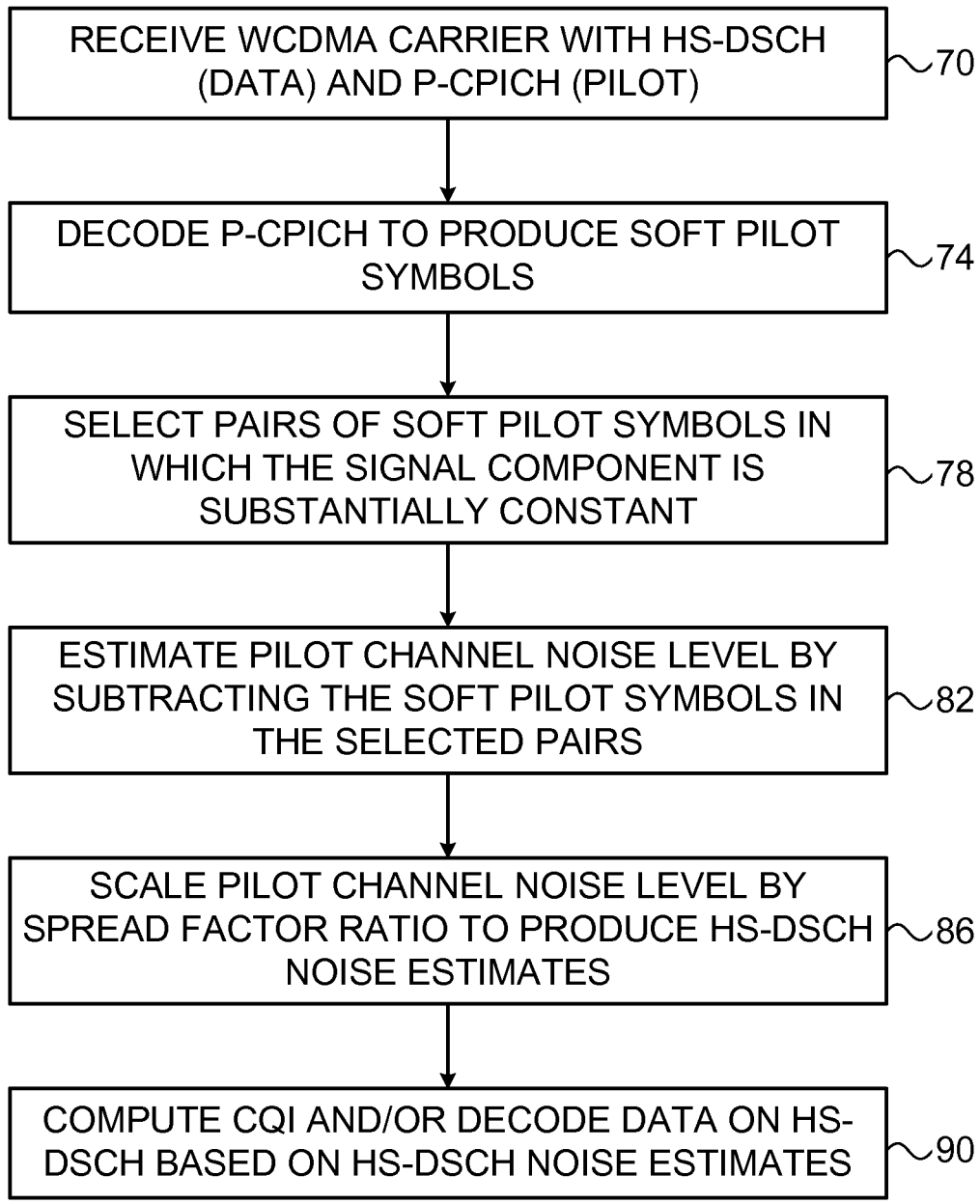
FIG. 2 is a flow chart that schematically illustrates a method for estimating noise level for a High-Speed Downlink Shared channel (HS-DSCH) based on Primary Common Pilot Channel (P-CPICH) measurements, in accordance with an embodiment that is described herein.

FIG. 2 is a flow chart that schematically illustrates a method for estimating noise level for a data channel (in the present example a High-Speed Downlink Shared channel (HS-DSCH)) based on Primary Common Pilot Channel (P-CPICH) measurements, in accordance with an embodiment that is described herein. The method begins with RX FE 28 of UE 20 receiving a WCDMA carrier, at a reception operation 70. In this example the WCDMA carrier carries at least a HS-DSCH and a P-CPICH. (As noted above, the carrier need not necessarily carry a HS-DSCH.) In an embodiment, the carrier carries a P-CPICH, one or more HS-DSCH and one or more other channels such as High-Speed Shared Control Channels (HS-SCCH).

Low-level receiver 36 decodes the P-CPICH to produce de-spread soft pilot symbols, at a pilot decoding operation 74.

In an embodiment, P-CPICH noise estimation module 40 selects pairs of soft pilot symbols as explained above, at a pair selection operation 78. (In an embodiment, the selection is performed by a dedicated selection module not shown in the figure, either in module 40 or separate from it.) Module 40 estimates the noise level on the P-CPICH by computing the difference between the two soft pilot symbols in each pair, at a difference calculation operation 82. As explained above, each soft pilot symbol is represented by a complex numerical value, and the difference between two soft pilot symbols is computed by subtracting one of the complex numerical values from the other. In an example embodiment, module 40 digitally subtracts one soft pilot symbol from the other in each pair. Module 40 typically averages the differences over multiple pairs, e.g., by (i) calculating the square of each difference and (ii) calculating an average of the squared differences. The resulting average is typically divided by two to obtain a per-symbol noise power estimate for the pilot channel.

In an embodiment, scaler 44 scales the pilot channel noise estimates by the ratio between the spread factor used on the HS-DSCH (denoted $SF_{HSD}$) and the spread factor used on the P-CPICH (denoted $SF_P$), at a scaling operation 86. Scaler 44 thus outputs estimates of the noise power on the HS-DSCH. Processing circuitry 32 uses the HS-DSCH noise estimates, for example for soft decoding the HS-DSCH data and/or for CQI estimation, at a processing operation 90.

The following description gives additional details as to the implementation of the method of FIG. 2, and the operation of the elements of processing circuitry 32. The description assumes a single-path channel between the base station and UE 20, and that UE 20 comprises two receive antennas 24. The disclosed techniques, however, are in no way limited to such cases, and the equations below can be extended to cover multi-path channels and/or other numbers of receive antennas, including a single receive antenna.

When UE 20 comprises two receive antennas 24 and operates in a normal mode (i.e., not in transmit diversity), the received WCDMA signal can be written as:

$$\begin{bmatrix} v_1 \\ v_2 \end{bmatrix} = \begin{bmatrix} h_1 \\ h_2 \end{bmatrix}(\tilde{c}_{HSD} + \tilde{c}_P + \tilde{c}_{HSC} + \tilde{c}_{OTHER}) + \begin{bmatrix} n_1 \\ n_2 \end{bmatrix} \quad \text{Equation 1}$$

The 1 and 2 subscripts in Equation 1 refer to the index of the receive antenna, $\tilde{c}_{HSD}$ denotes a combined transmitted symbol and chip on the HS-DSCH, $\tilde{c}_P$ denotes a combined transmitted symbol and chip on the pilot channel, $\tilde{c}_{HSC}$ denotes a combined transmitted symbol and chip on the HS-SCCH, $\tilde{c}_{OTHER}$ denotes the sum of all other chips and symbols transmitted on the WCDMA carrier, h denotes the channel taps (channel response from the base station to the UE), and η denotes the noise components in the received signal. For the sake of simplicity, although not necessarily, the noise power is assumed equal for both receive antennas. The noise power is denoted $\sigma_\eta^2$.

In some embodiments, circuitry 32 decodes the HS-DSCH by processing the received spread-spectrum chips of the HS-DSCH signal, and decoding the chips to produce soft outputs per symbol. For a linear receiver, a Finite Impulse Response (FIR) is applied to the received chips, i.e., $F^H v$. The chip outputs are then de-spread using the appropriate HS-DSCH spreading code over the symbol period (with a spread factor $SF_{HSD}$=16 chips per symbol), to produce soft symbol outputs.

The soft HS-DSCH symbols can be written in matrix form as:

$$x = \gamma_{HSD} F^H h S_{HSD} + F^H \eta_{HSD} \quad \text{Equation 2}$$

$$= \gamma_{HSD} G s_{HSD} + F^H \eta_{HSD}$$

wherein $(\ )^H$ denotes complex conjugate and transpose, $v=[v_1\ v_2]^T$, $F=[F_1\ F_2]^T$, $h=[h_1\ h_2]^T$ where the subscripts refer to the receive antenna index, $\gamma_{HSD}$, denotes a factor that is dependent on the HS-DSCH transmit power and spread factor, $G=F^H h$ denotes the signal gain, and $S_{HSD}$) denotes the transmitted HS-DSCH symbol (using QPSK, 16QAM or 64QAM modulation) normalized to unit power. Interference from other physical channels transmitted from the same cell is not addressed, since all downlink channels are assumed orthogonal. The power of each element of $n_{HSD}$ is $\sigma^2 = \sigma_\eta^2 SF_{HSD}$. The HS-DSCH noise power is thus given by:

$$F^H F \sigma_\eta^2 SF_{HSD}. \quad \text{Equation 3}$$

It is noted that the linear processor $F^H$ (FIR filter) can be used to implement various types of receivers. For a RAKE receiver, for example, $F=\hat{h}$, wherein $\hat{h}$ denotes the estimated channel for the two receive antennas. For Maximal Ratio Combining (MRC), each $\hat{h}_i$ is replaced by $\hat{h}_i/\sigma_i^2$ in the RAKE receiver. For a Minimum Mean Square Error (MMSE) equalizer receiver, the equalizer filter taps $F_i$ for each antenna can be obtained by solving $\arg\min E[|\tilde{c}_d - F^H v|^2]$, which yields $F=(\hat{R}_{vv})^{-1}\hat{h}$, where $$R_{vv} = E\begin{bmatrix} v_1 v_1^* & v_1 v_2^* \\ v_2 v_1^* & v_2 v_2^* \end{bmatrix}.$$

E[ ] denotes expectation and $\tilde{c}_d$ denotes the desired combined chip/symbol.

As explained above, in some embodiments processing circuitry 32 estimates the noise level for the HS-DSCH using the pilot channel (P-CPICH). Following the above equations, the soft symbol output of the pilot channel can be written as:

$$y = \gamma_P G s_P + F^H \eta_P \quad \text{Equation 4}$$

wherein the pilot noise power is given in Equation 3 above with the HS-DSCH spread factor replaced with the P-CPICH spread factor. Therefore, once the noise level of the pilot channel is estimated successfully, the noise power of the HS-DSCH can be estimated by scaling the noise level of the pilot channel by the spread factor ratio $SF_{HSD}/SF_P$. In 3GPP WCDMA, the P-CPICH channel has a spread factor of 256 chips per symbol, and the HS-DSCH channel has a spread factor of 16 chips per symbol.

It is possible in principle to estimate the pilot symbols and subtract them from the received signal in order to obtain a noise estimate. This solution is simple to implement, since the pilot symbols are known a-priori to the receiver, and therefore the receiver could only estimate $\gamma_P G$. In such a solution, a noise sample is obtained for each soft pilot symbol, and multiple noise samples are then squared and averaged to produce a noise power estimate. In practice, however, this scheme is sometimes inaccurate because it attempts to estimate noise levels that are several orders of magnitude smaller than the signal that is being estimated and subtracted out (e.g., 30-40 dB smaller in some scenarios).

By contrast, in the disclosed embodiment circuitry 32 uses the fact that the pilot symbols are constant and that the signal component (as opposed to the noise component) of the received pilot channel changes slowly over time, depending on UE velocity.

In an example embodiment, circuitry 32 computes differences between successive soft pilot symbols. Assuming the signal component does not change considerably between two successive symbols, and assuming the noise is uncorrelated between symbols, the signal component will effectively cancel out and the differences will be indicative of the pilot channel noise.

The resulting noise samples are given by $F^H(n_P^I - n_P^{II})$, wherein the I and II superscripts refer to the two neighboring pilot symbols. The noise power is given by $F^H F \sigma_\eta^2 SF_P$. Circuitry 32 squares and averages the differences, to produce a pilot channel noise power estimate. Since the estimate is based on differences, it is typically normalized by an additional factor of two in order to reflect the true per-symbol noise power.

In an alternative embodiment, circuitry 32 defines a range of N symbols over which the signal part of the pilot channel is assumed to be substantially constant, and then computes differences between pairs of soft pilot symbols that are no more than N symbols apart. Each difference gives a respective noise sample, and multiple such samples are squared and averaged. The result is normalized by two to produce the pilot channel noise power estimate. As explained above, in some embodiments circuitry 32 adapts the value of N depending on UE velocity.

In yet another embodiment, circuitry 32 defines a range of N symbols over which the signal part of the pilot channel is assumed substantially constant, and estimates the noise power by calculating:

$$\hat{\sigma}_N^2 = \frac{1}{N-1} \sum_n^N |y_n - \hat{m}_y|^2 \qquad \text{Equation 5}$$

wherein $$\hat{m}_y = \frac{1}{N} \sum_n^N y_n$$

denotes the average over the range of N received pilot symbols. This technique can be viewed as computing an average pilot symbol ($\hat{m}_y$), and computing differences between the pilot symbols and the average pilot symbol.
wherein $$\hat{m}_y = \frac{1}{N} \sum_n^N y_n$$

denotes the average over the range of N received pilot symbols. This technique can be viewed as computing an average pilot symbol ($\hat{m}_y$), and computing differences between the pilot symbols and the average pilot symbol.

In some embodiments, circuitry 32 computes an average of multiple P-CPICH noise estimates (outputs of scaler 44). Further alternatively, processing circuitry 32 may estimate the pilot channel noise power using any other suitable technique.

In some embodiments, the base station transmits the P-CPICH pilot channel using a Space-Time Transmit Diversity (STTD) mode. In this mode, the base station modifies the polarity of some of the pilot symbols in a frame according to a predefined pattern. In this mode of operation, it is not guaranteed that any pair of received pilot symbols will comprise pilot symbols having the same polarity.

In some embodiments, module 40 takes the symbol polarity pattern into account, and selects only pairs of pilot symbols in which both pilot symbols have the same polarity. This sort of selection ensures that the difference between the soft pilot symbols will truly reflect the pilot channel noise. In these embodiments, as shown in FIG. 1 above, module 40 accepts the P-CPICH transmit pattern as input, and uses this pattern to appropriately select pairs of pilot symbols for subtraction.

Figure 3:
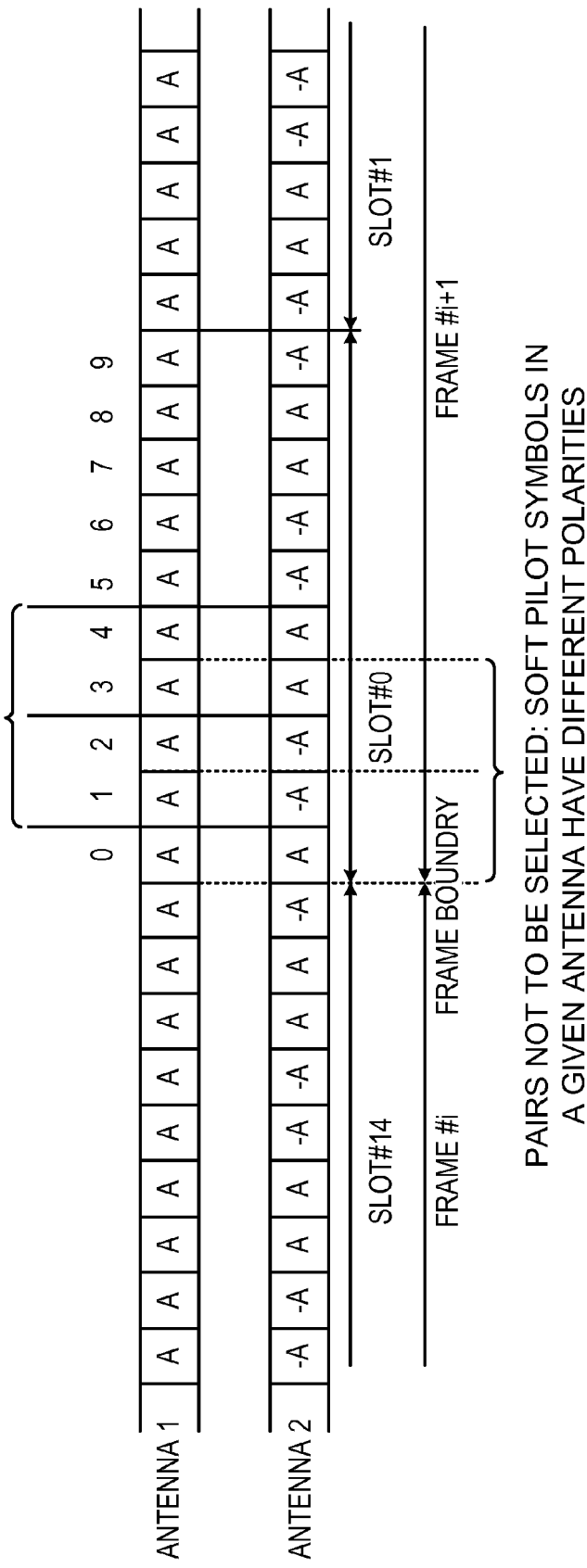
FIG. 3 is a diagram that schematically illustrates selection of pilot symbol pairs for noise estimation in a Space-Time Transmit Diversity (STTD) mode, in accordance with an embodiment that is described herein.

FIG. 3 is a diagram that schematically illustrates selection of pilot symbol pairs for noise estimation in STTD mode, in accordance with an embodiment that is described herein. The example of FIG. 3 shows the pattern of pilot symbols that are transmitted via the two base station transmit antennas. The transmitted complex symbol is denoted A. This pattern is typically repeated every frame. The pilot symbols transmitted via the first transmit antenna (top of the figure) all have the same polarity and are marked "A". Some of the pilot symbols transmitted via the second transmit antenna (bottom of the figure), however, have an inverse polarity and are marked "−A".

If module 40 were to select a pair of pilot symbols in which one symbol is "A" and the other is "−A", the subtraction would not produce a true noise estimate. Therefore, in some embodiments, module 40 uses the known P-CPICH transmission pattern to select pairs of pilot symbols in which both pilot symbols have the same polarity (i.e., both are "A" or both are "−A").

In the example pattern of FIG. 3, legitimate pairs of adjacent pilot symbols are marked at the top of the figure. Pairs of pilot symbols that are to be avoided are marked at the bottom of the figure. In the legitimate pairs, the pilot symbols are of the same polarity in each of the transmit antennas. When selecting only adjacent pilot symbols, in an embodiment, the technique reduces the number of pairs per slot (and thus the number of noise samples per slot) from ten to five. Note also that the transmit pattern is reset at the frame boundary. Therefore, once every fifteen slots there will be a slot having only four legitimate pairs (and thus four noise estimates).

The example of FIG. 3 shows a specific example transmit pattern and pair selection scheme. In alternative embodiments, any other suitable pattern and selection scheme can be used, such as patterns having other pilot polarities or phases, other numbers of transmit antennas and/or other subsets of legitimate pairs of pilot symbols (e.g., non-adjacent symbols).

When using the STTD mode, the STTD pilot signal is transmitted differently than the STTD HS-DSCH signal, and therefore the pilot channel noise estimate may not genuinely reflect the data channel noise level. The following description gives an example scheme using which module 40 is able to utilize the received soft pilot symbols to estimate the HS-DSCH noise.

For a WCDMA carrier that is transmitted in the STTD mode, the received signal can be modeled as a generalization of Equation 1 above:

$$\begin{bmatrix} v_1 \\ v_2 \end{bmatrix} = \begin{bmatrix} h_{1p} & h_{1d} \\ h_{2p} & h_{2d} \end{bmatrix} \left( \begin{bmatrix} \tilde{c}_{HDS,p} \\ \tilde{c}_{HSD,d} \end{bmatrix} + \begin{bmatrix} \tilde{c}_{P,p} \\ \tilde{c}_{P,d} \end{bmatrix} + \begin{bmatrix} \tilde{c}_{HSC,p} \\ \tilde{c}_{HSC,d} \end{bmatrix} + \begin{bmatrix} \tilde{c}_{other,p} \\ \tilde{c}_{other,d} \end{bmatrix} \right) + \begin{bmatrix} \eta_1 \\ \eta_2 \end{bmatrix} \qquad \text{Equation 6}$$

wherein the 1 and 2 subscripts refer to the receive antenna index, the p and d subscripts refer respectively to the primary and diversity transmit antenna, and h refers to the multipath channel response. For example, $h_{1p}$ denotes the channel tap between the primary base station transmit antenna and the first UE receive antenna.

In these embodiments, low-level receiver 36 applies primary and diversity linear processors denoted $F_p$ and $F_d$, respectively. For a RAKE receiver, for example, the linear processors are given by:

$$F_p = \begin{bmatrix} F_{1p} \\ F_{2p} \end{bmatrix} = \begin{bmatrix} h_{1p} \\ h_{2p} \end{bmatrix}, F_d = \begin{bmatrix} F_{1d} \\ F_{2d} \end{bmatrix} = \begin{bmatrix} h_{1d} \\ h_{2d} \end{bmatrix} \quad \text{Equation 7}$$

For a MMSE equalizer receiver, as another example, the linear processors are given by:

$$F_p = \begin{bmatrix} F_{1p} \\ F_{2p} \end{bmatrix} = (\hat{R}_{vv})^{-1} \begin{bmatrix} h_{1p} \\ h_{2p} \end{bmatrix} \quad \text{Equation 8}$$

$$F_d = \begin{bmatrix} F_{1d} \\ F_{2d} \end{bmatrix} = (\hat{R}_{vv})^{-1} \begin{bmatrix} h_{1d} \\ h_{2d} \end{bmatrix}$$

Demodulating the STTD HS-DSCH symbols involves operating over pairs of de-spread soft symbol outputs:

$$\begin{bmatrix} x_p^I & x_p^{II} \\ x_d^I & x_d^{II} \end{bmatrix} = \begin{bmatrix} F_{1p}^* & F_{2p}^* \\ F_{1d}^* & F_{2d}^* \end{bmatrix} \quad \text{Equation 9}$$

$$\left( \begin{bmatrix} h_{1p} & h_{1d} \\ h_{2p} & h_{2d} \end{bmatrix} \begin{bmatrix} s_1 & s_2 \\ -s_2^* & s_1^* \end{bmatrix} \gamma_{HSD} + \begin{bmatrix} n_{HSD,1}^I & n_{HSD,1}^{II} \\ n_{HSD,2}^I & n_{HSD,2}^{II} \end{bmatrix} \right) =$$

$$\gamma_{HSD} \begin{bmatrix} G_{pp} & G_{pd} \\ G_{dp} & G_{dd} \end{bmatrix} \begin{bmatrix} s_1 & s_2 \\ -s_2^* & s_1^* \end{bmatrix} + \begin{bmatrix} F_p^H \\ F_d^H \end{bmatrix} [n_{HSD}^I \quad n_{HSD}^{II}]$$

wherein the I and II superscripts refer to the indices of the successive symbols. As can be seen in the equation, the HS-DSCH symbols $s_1$ and $s_2$ are transmitted using STTD (Alamouti) encoding via the primary and diversity transmit antennas in two successive symbol intervals.

These two symbols are decoded using STTD (Alamouti) decoding:

Equation 10

$$\hat{s}_1 = x_p^I + (x_d^{II})^* = \alpha_{HSD} s_1 (G_{pp} + G_{dd}) + F_p^H n_{HSD}^I + (F_d^H n_{HSD}^{II})^*$$
$$\hat{s}_2 = -(x_d^I)^* + x_p^{II} = \alpha_{HSD} s_2 (G_{pp} + G_{dd}) - (F_d^H n_{HSD}^I)^* + F_p^H n_{HSD}^{II}$$

Therefore, the noise power of the HS-DSCH is given by:

$$(F_p^H F_p + F_d^H F_d) \sigma_\eta^2 SF_{HSD} \quad \text{Equation 11}$$

The primary and diversity soft pilot signals, over two intervals in which the same pilot symbols were transmitted, are given by, for example:

$$\begin{bmatrix} y_p^I & y_p^{II} \\ y_d^I & y_d^{II} \end{bmatrix} = \alpha_{pilot} \begin{bmatrix} G_{pp} & G_{pd} \\ G_{dp} & G_{dd} \end{bmatrix} \begin{bmatrix} A & A \\ -A & -A \end{bmatrix} + \begin{bmatrix} F_p^H \\ F_d^H \end{bmatrix} [n_p^I \quad n_p^{II}] \quad \text{Equation 12}$$

In this embodiment, module 40 estimates the HS-DSCH noise from the four soft pilot symbols of these two intervals by calculating:

$$\frac{1}{2} E\left[ (y_p^I - y_p^{II})^2 + (y_d^I - y_d^{II})^2 \right] = \quad \text{Equation 13}$$

$$\frac{1}{2} E\left[ (F_p^H (n_p^I - n_p^{II}))^2 + (F_d^H (n_p^I - n_p^{II}))^2 \right]$$

In an embodiment, module 40 approximates the expectation by averaging over a number of noise samples. This scheme effectively uses the primary soft pilot symbols to estimate the primary noise term $F_p^H F_p \sigma_\eta^2 SF_p$, and the diversity soft pilot symbols to estimate the diversity noise term $F_d^H F_d \sigma_\eta^2 SF_p$. Thus, the resulting P-CPICH noise power estimate is given by:

$$(F_p^H F_p + F_d^H F_d) \sigma_\eta^2 SF_P \quad \text{Equation 14}$$

As explained above, this noise estimate is translated by scaler 44 into a HS-DSCH noise estimate by scaling it by the spread factor ratio $SF_{HSD}/SF_P$.

It is noted that the above-described scheme is not limited to successive pairs of pilot symbols. If, for example, the pilot signal component is substantially constant over a larger block of symbols, module 40 may produce noise samples from pairs of soft pilot symbols that are not necessarily adjacent. Such a scheme would provide additional noise samples and therefore reduce the estimation variance. In order to apply this scheme, however, both intervals being used should have the same transmitted pilot pattern for the primary and diversity transmit antennas.

In an alternative embodiment for use in the STTD mode, module 40 manipulates the primary and diversity soft pilot symbols in order to create two virtual pilot signals. In order to perform this task, module 40 appropriately combines pairs of soft pilot symbols in which the diversity transmitted pilot symbols are different:

$$\begin{bmatrix} y_p^I & y_p^{II} \\ y_d^I & y_d^{II} \end{bmatrix} = \alpha_{pilot} \begin{bmatrix} G_{pp} & G_{pd} \\ G_{dp} & G_{dd} \end{bmatrix} \begin{bmatrix} A & A \\ -A & A \end{bmatrix} + \begin{bmatrix} F_p^H \\ F_d^H \end{bmatrix} [n_p^I \quad n_p^{II}] \quad \text{Equation 15}$$

The two virtual pilot signals are given by:

$$\begin{bmatrix} q_p \\ q_d \end{bmatrix} = \quad \text{Equation 16}$$

$$\left( \begin{bmatrix} y_p^I \\ y_d^I \end{bmatrix} + \begin{bmatrix} y_p^{II} \\ y_d^{II} \end{bmatrix} \right) = \alpha_{pilot} \begin{bmatrix} G_{pp} & G_{pd} \\ G_{dp} & G_{dd} \end{bmatrix} \begin{bmatrix} 2A \\ 0 \end{bmatrix} + F^H (n_p^I + n_p^{II})$$

$$\begin{bmatrix} r_p \\ r_d \end{bmatrix} \left( -\begin{bmatrix} y_p^I \\ y_d^I \end{bmatrix} + \begin{bmatrix} y_p^{II} \\ y_d^{II} \end{bmatrix} \right) =$$

-continued $$\alpha_{pilot}\begin{bmatrix} G_{pp} & G_{pd} \\ G_{dp} & G_{dd} \end{bmatrix}\begin{bmatrix} 0 \\ 2A \end{bmatrix} + F^H(-n_P^I + n_P^{II})$$

For pairs of pilot symbols in which the transmit pattern is reversed (i.e., $$\begin{bmatrix} A & A \\ A & -A \end{bmatrix}),$$

module 40 may produce the virtual pilot signal r as:

$$\begin{bmatrix} r_p \\ r_d \end{bmatrix} = \qquad \text{Equation 17}$$

$$\left(\begin{bmatrix} y_p^I \\ y_d^I \end{bmatrix} - \begin{bmatrix} y_p^{II} \\ y_d^{II} \end{bmatrix}\right) = \alpha_{pilot}\begin{bmatrix} G_{pp} & G_{pd} \\ G_{dp} & G_{dd} \end{bmatrix}\begin{bmatrix} 0 \\ 2A \end{bmatrix} + F^H(n_P^I - n_P^{II})$$

This scheme enables module 40 to operate on all five successive pairs of pilot symbols of each slot, and produce two virtual pilot signals each having five soft pilot symbols. Both of these virtual pilot signals have primary components and diversity components as shown in the equations. As in the previous scheme, module 40 uses the primary components to estimate a primary noise term and the diversity components to estimate the diversity noise term. In an example embodiment, the desired noise is formed by:

$$\frac{1}{2}E[(q_p^I - q_p^{II})^2 + (q_d^I - q_d^{II})^2] = \qquad \text{Equation 18}$$

$$\frac{1}{2}E[(r_p^I - r_p^{II})^2 + (r_d^I - r_d^{II})^2] = (F_p^H F_p + F_d^H F_d)\sigma_\eta^2 SF_P$$

In an embodiment, module 40 approximates the expectation by averaging over a number of noise samples. Both the r and q virtual pilot signals change over time slowly, similarly to the soft pilot symbols used in the normal mode. Therefore, module 40 may use any of the noise estimation methods described above for the normal mode with these virtual pilot signals. Typically, module 40 estimates the noise separately from the virtual pilot primary components and from the virtual pilot diversity components, and then adds the two noise terms.

In 3GPP WCDMA, when the HS-DSCH is transmitted using Closed-Loop Transmit Diversity (CLTD) mode, the P-CPICH is transmitted using the STTD mode. Therefore, the pilot channel noise estimate does not reflect the data channel noise level. The description that follows gives example schemes, using which module 40 uses the soft pilot symbols to estimate the data channel noise level in this scenario.

For CLTD, the received signal is given by:

$$\begin{bmatrix} v_1 \\ v_2 \end{bmatrix} = \begin{bmatrix} h_{1p} & h_{1d} \\ h_{2p} & h_{2d} \end{bmatrix} \qquad \text{Equation 19}$$

$$\left(\begin{bmatrix} w_p \\ w_d \end{bmatrix}\tilde{c}_{HSD} + \begin{bmatrix} \tilde{c}_{P,p} \\ \tilde{c}_{P,d} \end{bmatrix} + \begin{bmatrix} \tilde{c}_{HSC,p} \\ \tilde{c}_{HSC,d} \end{bmatrix} + \begin{bmatrix} \tilde{c}_{other,p} \\ \tilde{c}_{other,d} \end{bmatrix}\right) + \begin{bmatrix} \eta_1 \\ \eta_2 \end{bmatrix}$$

wherein $w_p$ and $w_d$ denote the CLTD weights that are assigned in the base station to the signals transmitted via the primary and diversity transmit antennas, respectively. Typically for a 3GPP WCDMA system, $w_p = 1\sqrt{2}$, $w_d = e^{j\theta}\sqrt{2}$, wherein $\theta \in \{\pi/4, 3\pi/4, 5\pi/4, 7\pi/4\}$. We define $w = [w_p, w_d]^T$.

In some embodiments, recovering the CLTD HS-DSCH signal involves applying a linear processor in low-level receiver 36, followed by applying the primary and diversity CLTD weights and de-spreading over a symbol interval:

$$x = [w_p^* \; w_d^*]\begin{bmatrix} F_{1p}^* & F_{2p}^* \\ F_{1d}^* & F_{2d}^* \end{bmatrix} \qquad \text{Equation 20}$$

$$\left(\begin{bmatrix} h_{1p} & h_{1d} \\ h_{2p} & h_{2d} \end{bmatrix}\begin{bmatrix} w_p \\ w_d \end{bmatrix}\alpha_{HSD}s_{HSD} + \begin{bmatrix} n_{HSD,1} \\ n_{HSD,2} \end{bmatrix}\right) =$$

$$\alpha_{HSD}w^H G w s_{HSD} + w^H F^H n_{HSD}$$

The noise power of the HS-DSCH is thus given by:

$$w^H F^H F w \sigma_\eta^2 SF_{HSD} \qquad \text{Equation 21}$$

In an embodiment, module 40 uses the above-defined primary and diversity soft pilot symbols over two intervals in which the transmitted symbols are the same, to form the desired noise term:

$$w^H\begin{bmatrix} y_p^I - y_p^{II} \\ y_d^I - y_d^{II} \end{bmatrix} = w^H F^H (n_P^I - n_P^{II}) \qquad \text{Equation 22}$$

Module 40 then squares and averages multiple such noise samples to obtain an estimate of the pilot channel noise power:

$$w^H F^H F w \sigma_\eta^2 2 SF_P \qquad \text{Equation 23}$$

Module 40 divides this estimate by two and scaler 44 scales it by the spread factor ratio $SF_{HSD}/SF_P$, to obtain a noise estimate for the HS-DSCH. As previously noted, this scheme is not limited to successive pairs of pilot symbols. If the signal component is substantially constant over a larger block of symbols, module 40 may create noise samples from pairs of pilot symbols that are not necessarily adjacent. Such a scheme would provide additional noise samples and therefore reduce the estimation variance. When using this scheme, however, both intervals should have the same transmitted pilot pattern for the primary and diversity antennas.

In an alternative embodiment for use in the CLTD mode, module 40 uses two virtual pilot signals as defined above for the STTD mode (see Equation 16 above). Using the primary and diversity virtual pilot components of each STTD virtual pilot signal, two CLTD virtual pilot signals are given by:

$$u_p = w^H\begin{bmatrix} q_p \\ q_d \end{bmatrix} = w^H\left(\begin{bmatrix} y_p^I \\ y_d^I \end{bmatrix} + \begin{bmatrix} y_p^{II} \\ y_d^{II} \end{bmatrix}\right) = \qquad \text{Equation 24}$$

$$\alpha_{pilot}w^H\begin{bmatrix} G_{pp} & G_{pd} \\ G_{dp} & G_{dd} \end{bmatrix}\begin{bmatrix} 2A \\ 0 \end{bmatrix} + w^H F^H(n_P^I + n_P^{II})$$

$$u_d = w^H\begin{bmatrix} r_p \\ r_d \end{bmatrix} = w^H\left(\mp\begin{bmatrix} y_p^I \\ y_d^I \end{bmatrix} \pm \begin{bmatrix} y_p^{II} \\ y_d^{II} \end{bmatrix}\right) =$$

-continued $$\alpha_{pilot} w^H \begin{bmatrix} G_{pp} & G_{pd} \\ G_{dp} & G_{dd} \end{bmatrix} \begin{bmatrix} 0 \\ 2A \end{bmatrix} + w^H F^H (\mp n_P^I \pm n_P^{II})$$

In both virtual pilot signals, the noise term power for each sample is $w^H F^H F w \sigma_n^2 2SF_P$, which is a scaled version of the HS-DSCH CLTD noise. This scheme enables module 40 to use all five successive pairs of pilot symbols per slot, and produce two virtual pilot signals each having five soft outputs. Both of these virtual pilot signals change over time slowly, similarly to the soft pilot symbols used in the normal mode. Therefore, module 40 may use any of the noise estimation methods described above for the normal mode with these virtual pilot signals.

In some scenarios, the base station transmits the WCDMA carrier using a Multiple-Input Multiple-Output (MIMO) mode, also referred to as spatial multiplexing. In this mode, multiple different data streams are transmitted concurrently using the multiple transmit and receive antennas. In MIMO mode, the received signal can be regarded as multiple CLTD streams that are transmitted in parallel. Each stream has a CLTD-like noise term, in addition to an inter-stream interference noise term. In some embodiments, UE 20 uses the above-described CLTD HS-DSCH noise estimation methods for estimating the HS-DSCH noise power in MIMO mode associated with the CLTD-like noise component.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving a Code Division Multiple Access (CDMA) carrier carrying at least a pilot channel;
   computing differences between selected soft pilot symbols received on the pilot channel, by processing the received soft pilot symbols to produce virtual pilot signals having signal components that vary over time at less than a predefined rate; and
   based on the computed differences between the selected soft pilot symbols received on the pilot channel, estimating a level of noise for a data channel that is to be transmitted on the CDMA carrier.

2. The method according to claim 1, wherein the soft pilot symbols are represented by respective complex numerical values, and wherein computing the differences comprises subtracting the complex numerical values of the selected soft pilot symbols from one another.

3. The method according to claim 1, wherein computing the differences comprises:
   specifying a maximal time duration between symbols on which the differences are to be computed;
   selecting soft pilot symbols that are separated from one another by no more than the maximal time duration; and
   computing the differences between the selected soft pilot symbols.

4. The method according to claim 3, wherein the selecting soft pilot symbols comprises choosing pairs of the soft pilot symbols that are separated by no more than the maximal time duration, and computing a respective difference between the soft pilot symbols in each pair.

5. The method according to claim 4, wherein the choosing pairs comprises selecting pairs of adjacent soft pilot symbols.

6. The method according to claim 3, wherein computing the differences comprises calculating an average value of the soft pilot symbols over the maximum time duration, and calculating the respective differences between the soft pilot symbols and the average value.

7. The method according to claim 3, wherein specifying the maximal time duration comprises adaptively setting the maximal time duration as a function of a velocity of motion of a receiver that receives the CDMA carrier.

8. The method according to claim 1, wherein receiving the CDMA carrier comprises receiving a sequence of the soft pilot symbols in which each soft pilot symbol has a respective polarity, and wherein computing the differences comprises identifying pairs of the soft pilot symbols such that the soft pilot symbols in each pair have the same polarity, and computing a respective difference between the soft pilot symbols in each pair.

9. The method according to claim 1, wherein receiving the CDMA carrier comprises receiving both the data channel and the pilot channel that are each transmitted via primary and diversity transmit antennas in accordance with a Space-Time Transmit Diversity (STTD) mode.

10. The method according to claim 9, wherein computing the differences comprises estimating first differences between pairs of the received soft pilot symbols corresponding to pilot symbols transmitted via the primary transmit antenna, and estimating second differences between pairs of the received soft pilot symbols corresponding to pilot symbols transmitted via the diversity transmit antenna.

11. The method according to claim 9, wherein computing the differences comprises processing the received soft pilot symbols corresponding to pilot symbols transmitted via the primary and diversity transmit antennas to produce a pair of the virtual pilot signals.

12. The method according to claim 1, wherein receiving the CDMA carrier comprises receiving the data channel that is transmitted via primary and diversity transmit antennas in accordance with a Closed-Loop Transmit Diversity (CLTD) mode, and receiving the pilot channel that is transmitted via the primary and diversity transmit antennas in accordance with a Space-Time Transmit Diversity (STTD) mode.

13. The method according to claim 12, wherein computing the differences comprises applying CLTD weights to first differences between pairs of the received soft pilot symbols corresponding to pilot symbols transmitted via the primary transmit antenna, and to second differences between pairs of the received soft pilot symbols corresponding to pilot symbols transmitted via the diversity transmit antenna.

14. The method according to claim 12, wherein computing the differences comprises applying CLTD weights to the received soft pilot symbols corresponding to pilot symbols transmitted via the primary and diversity transmit antennas to produce a pair of the virtual pilot signals.

15. The method according to claim 1, wherein receiving the CDMA carrier comprises receiving a Wideband CDMA (WCDMA) carrier.

16. The method according to claim 1, wherein estimating the level of noise comprises scaling the estimated level of noise by a ratio between a first spread factor used on the data channel and a second spread factor used on the pilot channel.

17. The method according to claim 1, wherein receiving the CDMA carrier comprises receiving the data channel that is transmitted via primary and diversity transmit antennas in accordance with a Multiple-Input Multiple-Output (MIMO) mode in which multiple data streams are transmitted concurrently via the primary and diversity transmit antennas.

18. Apparatus, comprising:
a receiver front end, which is configured to receive a Code Division Multiple Access (CDMA) carrier carrying at least a pilot channel; and
a processing circuitry, which is configured to compute differences between selected soft pilot symbols received on the pilot channel by processing the received soft pilot symbols to produce virtual pilot signals having signal components that vary over time at less than a predefined rate, and to estimate, based on the computed differences, a level of noise for a data channel that is to be transmitted on the CDMA carrier.

19. A mobile communication terminal comprising the apparatus of claim 18.

20. A chipset for processing signals in a mobile communication terminal, comprising the apparatus of claim 18.

\* \* \* \* \*